US012536061B1

United States Patent
Mahindru et al.

(10) Patent No.: US 12,536,061 B1
(45) Date of Patent: Jan. 27, 2026

(54) EXPLAINABILITY-DRIVEN CONTROL OF AN ALERT SUPPRESSION POLICY

(71) Applicant: INTERNATIONAL BUSINESS MACHINES CORPORATION, Armonk, NY (US)

(72) Inventors: Ruchi Mahindru, Elmsford, NY (US); Seema Nagar, Bangalore (IN); Stephen James Hussey, Orange, CA (US); Ian Manning, Cork (IE); Harshit Kumar, Delhi (IN); Karan Bhukar, Jaipur (IN); Amitkumar Manoharrao Paradkar, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/915,433

(22) Filed: Oct. 15, 2024

(51) Int. Cl.
*G06F 11/32* (2006.01)
*G06F 11/07* (2006.01)

(52) U.S. Cl.
CPC ........ *G06F 11/0781* (2013.01); *G06F 11/327* (2013.01)

(58) Field of Classification Search
CPC ............................ G06F 11/0781; G06F 11/327
USPC .......................................................... 714/57
See application file for complete search history.

(56) References Cited

U.S. PATENT DOCUMENTS

| 7,568,027 | B2 | 7/2009 | Becker |
| 8,380,838 | B2 * | 2/2013 | Bose ..................... G06F 11/076 709/224 |
| 8,495,661 | B2 * | 7/2013 | Carey ..................... G06F 9/542 709/201 |
| 8,516,596 | B2 | 8/2013 | Sandoval |

(Continued)

FOREIGN PATENT DOCUMENTS

| CN | 111108495 A | | 5/2020 | |
| CN | 114253807 A | * | 3/2022 | .......... G06F 11/3006 |
| CN | 112181960 B | | 5/2022 | |

OTHER PUBLICATIONS

APM Monitor, DATADOG, Retrieved from the Internet on Jul. 18, 2024: https://docs.datadoghq.com/monitors/types/apm/?tab=apmmetrics, 4 pages.

(Continued)

*Primary Examiner* — Chae M Ko
(74) *Attorney, Agent, or Firm* — CHIP LAW GROUP

(57) ABSTRACT

An approach is provided for controlling an alert suppression policy. Using historical training data and for a time period, an expected alert reduction for an alert suppression policy (ASP) is computed. The ASP is recommended for an information technology (IT) environment. During runtime and for the time period, an observed alert reduction for the ASP is computed. A visualization of a benefit of the ASP is generated by generating a visualization of a comparison of the observed alert reduction and the expected alert reduction. An explanation of why the ASP is recommended for the IT environment is generated by determining persistent regions (Continued)

for respective event time series from the historical training data and generating a visualization of the persistent regions on a time graph that includes a duration and a number of events for a given persistent region. Each event time series corresponds to a given resource for the ASP.

20 Claims, 6 Drawing Sheets

(56) References Cited

U.S. PATENT DOCUMENTS

| | | | |
|---|---|---|---|
| 8,745,201 B2 | 6/2014 | Park | |
| 8,898,299 B2 | 11/2014 | Atkins | |
| 9,916,445 B2 | 3/2018 | Ijiro | |
| 10,278,653 B2 | 5/2019 | Averina | |
| 10,325,476 B2* | 6/2019 | Becker | G06Q 10/107 |
| 11,243,865 B2 | 2/2022 | Chiba | |
| 11,436,537 B2 | 9/2022 | Jaenisch | |
| 11,625,291 B2* | 4/2023 | Freeman | G06F 11/1453 |
| | | | 714/48 |
| 2013/0132551 A1* | 5/2013 | Bose | G06F 11/0709 |
| | | | 709/223 |
| 2015/0205956 A1 | 7/2015 | Sakurai | |
| 2015/0325105 A1* | 11/2015 | Banerjee | G06F 11/0772 |
| | | | 340/506 |
| 2021/0303632 A1* | 9/2021 | Parthasarathy | G06F 11/0754 |
| 2022/0278889 A1 | 9/2022 | Malleshaiah | |
| 2023/0153187 A1* | 5/2023 | Goswami | G06F 11/0781 |
| | | | 714/57 |

OTHER PUBLICATIONS nofm.error.count.min.size, Retrieved from the Internet on Jul. 18, 2024: https://www.ibm.com/docs/en/oapi/1.3.6?topic=properties-nofmerrorcountminsize, Last updated: Jan. 3, 2024, 2 pages.

Notification strategy, Retrieved from the Internet on Jul. 18, 2024: https://www.ibm.com/docs/en/mas-cd/maximo-monitor/continuous-delivery?topic=actions-notification-strategy, Last updated: Apr. 1, 2024, 4 pages.

Bhukar et al., Dynamic Alert Suppression Policy for Noise Reduction in AIOps, 2024 IEEE/ACM 46th International Conference on Software Engineering: Software Engineering in Practice (ICSE SEIP), ICSE-SEIP '24, Apr. 14-20, 2024, Lisbon, Portugal, 11 pages.

About events, alerts and incidents, Last Updated: Apr. 24, 2024, IBM Cloud Pak® for AIOps, Retrieved from the Internet on Sep. 17, 2024: https://www.ibm.com/docs/en/cloud-paks/cloud-pak-aiops/4.5.1?topic=alerts-about-events-incidents, 3 pages.

* cited by examiner

EXPLAINABILITY-DRIVEN CONTROL OF AN ALERT SUPPRESSION POLICY

BACKGROUND

The present invention relates to artificial intelligence for information technology operations (AIOps), to data monitoring for AIOps, and to alert suppression policies.

SUMMARY

In one embodiment, the present invention provides a computer-implemented method. The method includes computing, by a processor set, using historical training data, and for a time period, an expected alert reduction for an alert suppression policy (ASP) recommended for an information technology (IT) environment. The method further includes computing, by the processor set, during runtime, and for the time period, an observed alert reduction for the ASP. The method further includes generating a visualization of a benefit of the ASP by generating a visualization of a comparison of the observed alert reduction and the expected alert reduction. The method further includes generating an explanation of why the ASP is recommended for the IT environment by determining persistent regions for respective event time series from the historical training data and generating a visualization of the persistent regions on a time graph that includes a duration and a number of events for a given persistent region. Each event time series corresponds to a given resource for the ASP.

A computer system and a computer program product corresponding to the above-summarized computer-implemented method are also described herein.

DETAILED DESCRIPTION

Overview

Figure 1:
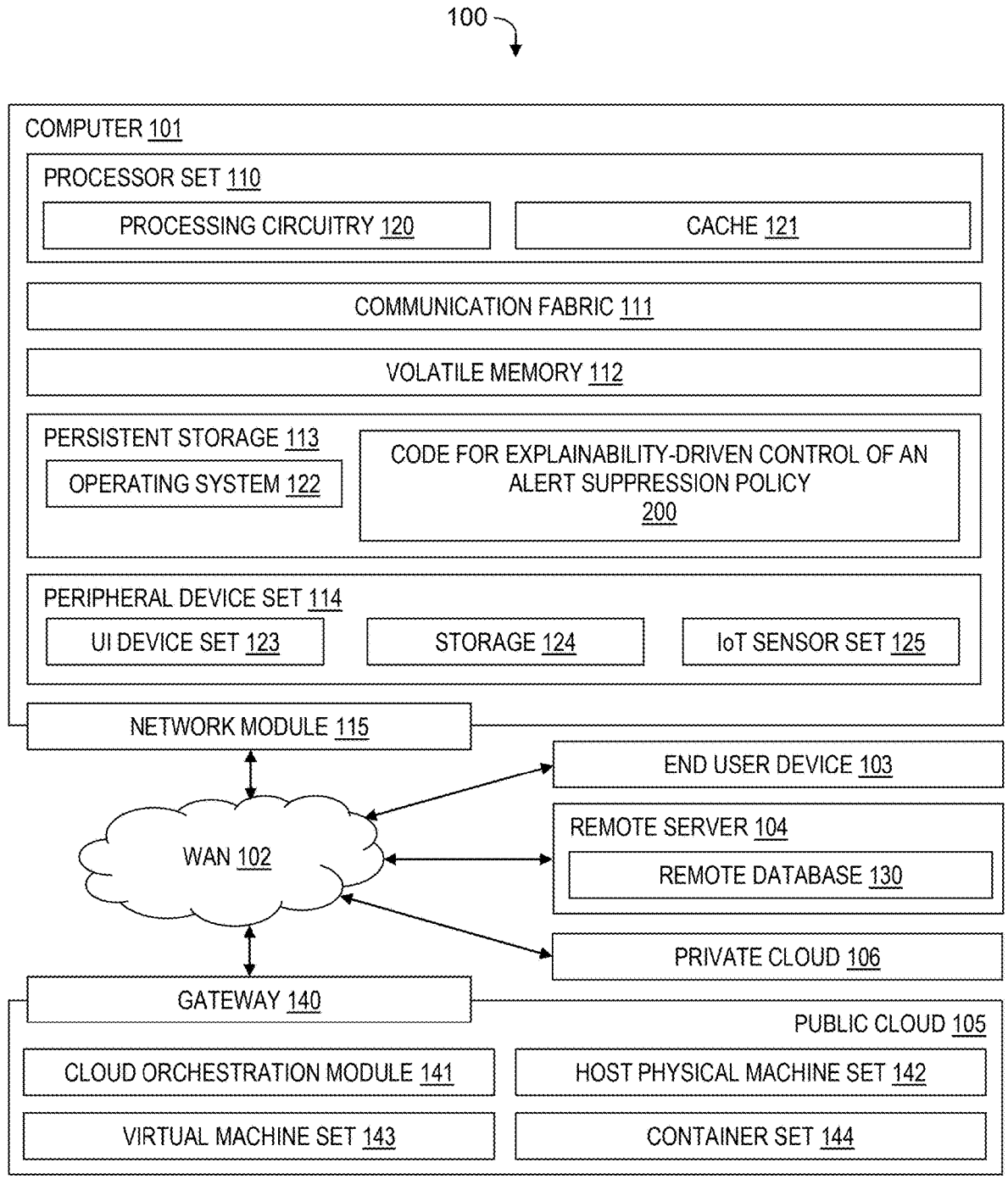
FIG. 1 is a block diagram of a system for explainability-driven control of an alert suppression policy, in accordance with embodiments of the present invention.

Frequent alert notifications to site reliability engineers (SREs) in an information technology (IT) environment are a common problem because the notifications are often false alarms, i.e., associated with short-lived spikes in anomalous events which are not indicative of actual issues that need to be resolved or which resolve on their own. To circumvent frequent alert notifications that are false alarms, SREs may ignore the first notification or the first and second notifications (i.e., ignore the "noise"), but take action if the alert notifications persist. The approach of ignoring the noise may lead to overlooking a significant alert notification that leads to serious consequences. Furthermore, a significant number of false alarms can impede the workflow of an SRE, thereby leading to decreased productivity.

A known approach to provide alert suppression includes hard-coding an alert suppression policy that suppresses an alert notification unless the system observes X number of events within a Y duration (e.g., an alert notification is not sent unless the system observes three events in a ten-minute duration). This hard-coded alert suppression policy is manually-defined, static, and common for all events; thereby providing an inflexible, one-size-fits-all approach. A manually-defined alert suppression policy is limited by the SRE's experience and knowledge that was acquired through system observation, and therefore fails to consider all relevant dimensions and leads to inadequate coverage and an increase in false positive alert notifications. Furthermore, the policy may not fit across all metrics and services, because each metric or service may generate events with a different frequency and velocity, and may not be able to adapt to the dynamic nature of the IT environment (e.g., a client's environment may behave differently on different days because workload patterns change across those days). Moreover, the creation and maintenance of the aforementioned manually-defined policies may be impractical for a large number of metric names and service names.

Another more recent approach (herein also referred to as Dynamic-X-Y for alert suppression) provides a system that learns and recommends X-Y Alert Suppression Policies from an identification of persistent regions in historical events data. The X and Y in the policy denotes an X number of events (e.g., log anomalies and metric anomalies) that must be observed in a duration Y to lead to an alert notification being sent; otherwise, an alert is suppressed. A region in a historical events time series is a persistent region if the region contains a statistically significant number of events that are contiguous and dense over an extended period of time. A persistent region for one item (i.e., service or metric) may be different from a persistent region for another item, because each item is dynamic, behaves differently, and has its own characteristics. The Dynamic-X-Y for alert suppression approach is a scalable, unsupervised method that reduces the aforementioned false alarms and overcomes the deficiencies of the manually-defined alert suppression approach described above.

In one implementation of the dynamic-X-Y for alert suppression, the alert suppression policies are disabled by default and a customer uses a dashboard to choose to enable one or more of the alert suppression policies so that the chosen policies are adopted and applied on incoming events data at runtime. The customer may not adopt the policy recommendations made by the dynamic-X-Y for alert suppression approach because benefits of enabling a recommended alert suppression policy are not visible to the customer, and the customer may not have an overall trust and confidence in the recommendations. This lack of adoption of the recommended policies results in one or more of the same disadvantages mentioned above relative to known alert suppression approaches.

Embodiments of the present invention address the aforementioned unique challenges by providing benefits and explainability for the recommended alert suppression policies (e.g., provide a tangible, visible benefit of an alert suppression policy and reason(s) for why the alert suppression policy is recommended), which leads to a user trusting, understanding, and having confidence in the policies, thereby facilitating an adoption of the policies by the user. As time passes, the alert suppression policies can become outdated and lose their significance because of multiple factors, such as changes in the IT environment (e.g., changes in a distributed computing environment), changes in deployment, and other external factors. Embodiments of the present invention provide a technique that uses a benefits computation to automatically identify policies that need refinement and policies that are ineffective or inactive.

In one embodiment, the technique disclosed herein enables (i) explanations of alert suppression policies in terms of expected and observed benefits and (ii) automatic performance of life-cycle functions needed to maintain alert suppression policies, including creating and refining a policy based on its significance, and detecting an ineffective or inactive policy. In one embodiment, the technique disclosed herein provides (i) a dynamic explanation which helps build trust and explains the benefit of the policy; (ii) an explanation in the form of why a policy is recommended; (iii) an automatic refinement of policies over a period of time which helps build trust and explains the benefit; and (iv) an automatic detection of ineffective or inactive policies.

In one embodiment, the technique disclosed herein builds and uses the aforementioned trust and explainability for the recommended alert suppression policies by implementing the following features: (i) expected benefit computation; (ii) observed benefit computation; (iii) unsupervised and automatic policy refinement; and (iv) automatic ineffective policy and inactive policy detection. The expected benefit computation is performed after alert suppression policies are computed and recommended. The expected benefit computation provides (i) the expected benefits achieved through the recommended alert suppression policies in terms of number of alerts, number of incidents, cost, and/or resources as compared to analogous metrics without the recommended alert suppression policies; and (ii) a visualization that conveys how the aforementioned values of X and Y in the dynamic-X-Y for alert suppression approach are determined from historical data. The observed benefit computation shows on a time scale the number of alerts, the number of incidents, cost, and/or resources for alert suppression policies that are applied at runtime as compared to expected benefits and/or as compared to analogous metrics without the alert suppression policies being applied. The policy refinement feature is based on the computed expected benefits and observed benefits. The ineffective policy and inactive policy detection feature is guided by (i) usage of a policy, (ii) divergence in observed benefits over a period; and/or (iii) divergence in observed and expected persistent regions.

As used herein, an alert is defined as a notification of an ongoing anomalous condition against a single managed entity (e.g., a network resource or a part of a network resource). Alerts have a start and an end time. The creation and evolution of alerts are based on events (i.e., records containing structured data summarizing key attributes of an occurrence on a managed entity). An alert is created when one or more events indicate an anomalous condition. As used herein, an incident is defined as the context around an issue which is currently severely impacting operations in an IT environment, and includes all alerts that are related to the issue and information about how the affected resources are related. The creation and evolution of incidents are based on alerts. If an alert is suppressed by an application of an alert suppression policy, then an incident that includes the alert is also suppressed automatically.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for explainability-driven control of an alert suppression policy, in accordance with embodiments of the present invention. Computing environment 100 contains an example of an environment for the execution of at least some of the computer code involved in performing the inventive methods, such as code 200 for explainability-driven control of an alert suppression policy. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

System and Process for Explainability-Driven Suppression Policy Control

Figure 2:
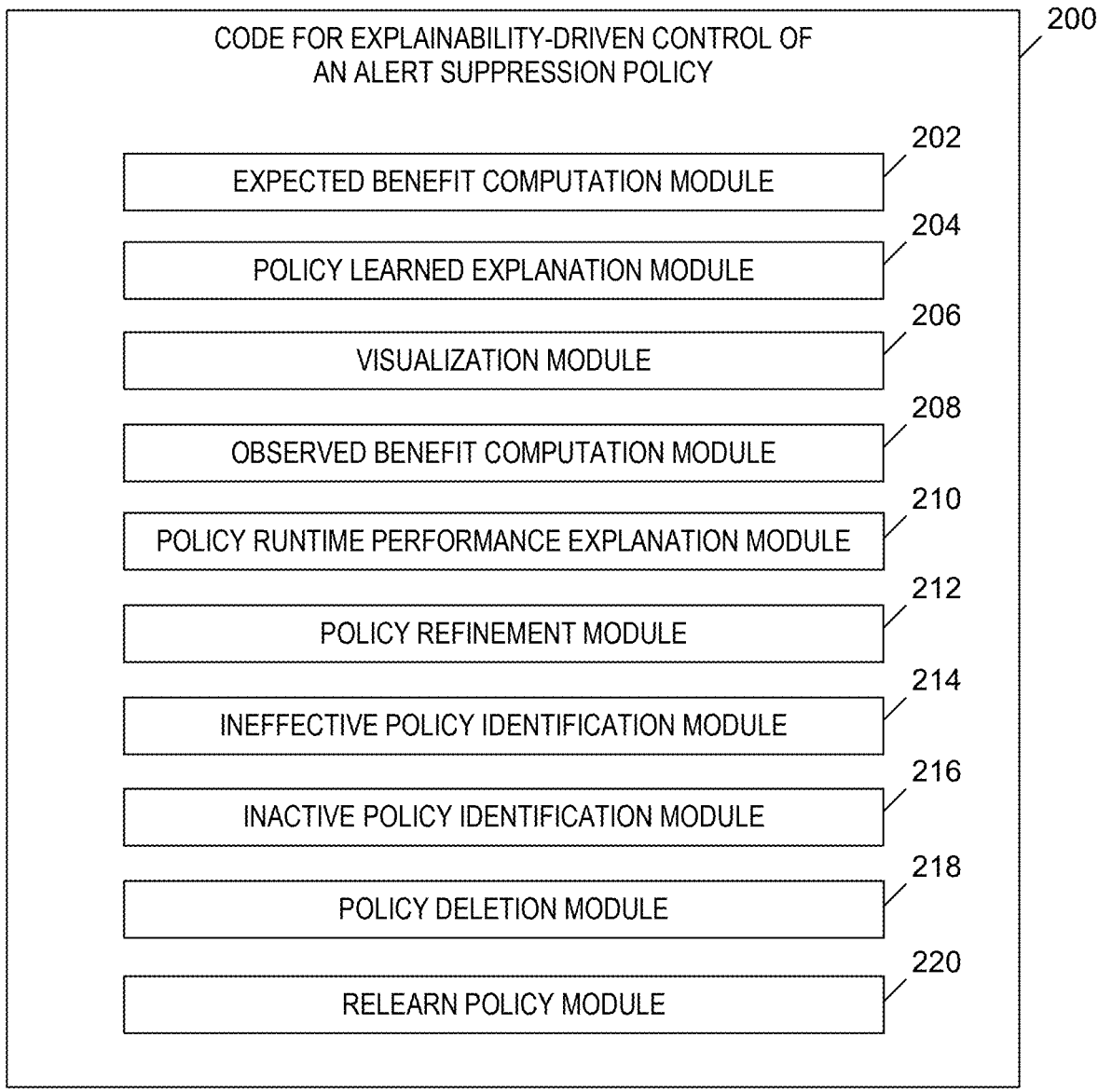
FIG. 2 is a block diagram of modules included in code included in the system of FIG. 1, in accordance with embodiments of the present invention.

FIG. 2 is a block diagram of modules included in code included in the system of FIG. 1, in accordance with embodiments of the present invention. Code 200 includes an expected benefit computation module 202, a policy learned explanation module 204, a visualization module 206, an observed benefit computation module 208, a policy runtime performance explanation module 210, a policy refinement module 212, an ineffective policy identification module 214, an inactive policy identification module 216, a policy deletion module 218, and a relearn policy module 220.

Expected benefit computation module 202 is configured to (i) receive as input one or more recommended alert suppression policies learned from historical training data (e.g., suppression policies generated and recommended by the Dynamic-X-Y for alert suppression technique); (ii) compute expected benefits achieved through implementing the recommended alert suppression policies, where the expected benefits are expressed in terms of number of alerts, number of incidents, cost, and/or resources as compared to the same metrics with respect to not having an alert suppression policy; and (iii) receive as input runtime streaming alerts and incidents. Each alert suppression policy is in the form of X and Y, where X is the number of events within Y duration. If a generated alert does not meet the criteria of X events within Y duration, then the alert suppression system suppresses the alert. The historical training data includes event time series, alerts on those events and the incidents reported on the alerts.

Policy learned explanation module 204 is configured to generate explanations of why the alert suppression policies were learned or recommended. In one embodiment, the explanations generated by policy learned explanation module 204 is based on an application of the alert suppression policies to the alerts present in the historical training data, and a measure of the reduction in the incidents reported in the historical training data.

Visualization module 206 is configured to generate and display a visualization that conveys how the values of X (i.e., number of events) and Y (i.e., duration) were determined from the historical training data.

Observed benefit computation module 208 is configured to (i) receive as input one or more recommended alert suppression policies; (ii) receive as input runtime streaming alerts and incidents; and (iii) compute observed benefits and display the observed benefits on a time scale, where the observed benefits are expressed in terms of the number of alerts, number of incidents, cost, and/or resources corresponding to a user's placement of a scrollable window or a user selection of a custom start and end date, and where the observed benefits are compared to the same metrics with respect to not having an alert suppression policy in place.

Policy runtime performance explanation module 210 is configured to generate an explanation of how each alert suppression policy is performing at runtime. In one embodiment, the explanations generated by policy runtime performance explanation module 210 are based on a computation of observed reductions in alerts and incidents, where each observed reduction is based on the suppression policies for alerts and incidents for each window of size W and with a slide H.

Visualization module 206 is further configured to generate and display a visualization of the observed reduction and the expected reduction as bar plots (also referred to herein as bar charts). In one embodiment, each bar plot includes pairs of bars, one pair for each suppression policy. For the bar plot for the observed reduction, one bar in the pair indicates the number of alerts (or incidents) generated based on detected events and the other bar in the pair indicates the number of alerts (or incidents) suppressed by the suppression policy. For the bar plot for the expected reduction, one bar in the pair indicates the number of alerts (or incidents) generated based on the historical training data and the other bar in the pair indicates the number of alerts (or incidents) that would have been generated had the suppression policy been applied.

Policy refinement module 212 is configured to (i) receive as input, over a specified, configurable time period, the expected benefits (i.e., expected reductions in the numbers of alerts and incidents) and observed benefits (i.e., observed reductions in the numbers of alerts and incidents) computed by expected benefit computation module 202 and observed benefit computation module 208, respectively; and (ii) determine if the deviation between the observed reductions and the expected reductions exceeds a predetermined threshold amount. If the deviation exceeds the threshold amount, policy refinement module 212 marks the suppression policy as requiring refinement and in response, the suppression policy system refines the suppression policy.

Ineffective policy identification module 214 is configured to (i) receive as input an explanation from policy learned explanation module 204 as to why a suppression policy is recommended; and (ii) determine if, in the current data about current events, the behavior of persistent regions significantly deviates from the explanation given for why a policy is recommended; and (iii) determine if the gain (e.g., reduction in alerts) is not significant over a given period of time.

Ineffective policy identification module 214 determines if the behavior of the persistent regions significantly deviates from the aforementioned explanation by determining if persistent region statistics for an enabled suppression policy, where the statistics include the number of persistent regions (averaged out) and the width of the persistent regions (averaged out), vary from the persistent region statistics from the training period by amounts that exceed respective predetermined threshold amounts. If the behavior of the persistent regions significantly deviates from the explanation given for why a policy is recommended, then ineffective policy identification module 214 marks the suppression policy as being ineffective.

Ineffective policy identification module 214 determines if the gain for alerts is not significant over a given period of time by treating the gain as a time series and analyzing patterns in the time series. If the time series is constantly decreasing and at a certain point in the time series the gain has plateaued out to an amount that is near zero (i.e., the difference between the gain and zero is less than a threshold amount), then ineffective policy identification module 214 marks the suppression policy as being ineffective because the policy is not providing enough gain. Ineffective policy identification module 214 performs similar operations for a gain relative to incidents (i.e., reduction in incidents), again treating the gain as a time series and determining whether the time series is constantly decreasing and plateauing out near zero.

Inactive policy identification module 216 is configured to determine whether or not a suppression policy has experienced significant inactivity by determining whether a trigger period exceeds a predetermined threshold amount of time (i.e., determining whether the amount of time between the current time and the time of the most recent triggering of the suppression policy exceeds the threshold amount of time). If the suppression policy has experienced significant inactivity, then inactive policy identification module 216 marks the suppression policy as being inactive.

Policy deletion module 218 is configured to delete a suppression policy that is marked as being (i) ineffective by ineffective policy identification module 214 or (ii) inactive by inactive policy identification module 216.

Relearn policy module 220 is configured to relearn a suppression policy and repeat the operations described above relative to expected benefit computation module 202 and policy learned explanation module 204, where relearn policy module 220 is implemented in response to the refinement of a suppression policy by policy refinement module 212.

The functionality of the modules included in code 200 is described in more detail in the discussions presented below relative to FIG. 3, FIG. 4, FIG. 5, FIG. 6, FIG. 7, and FIG. 8.

Figure 3:
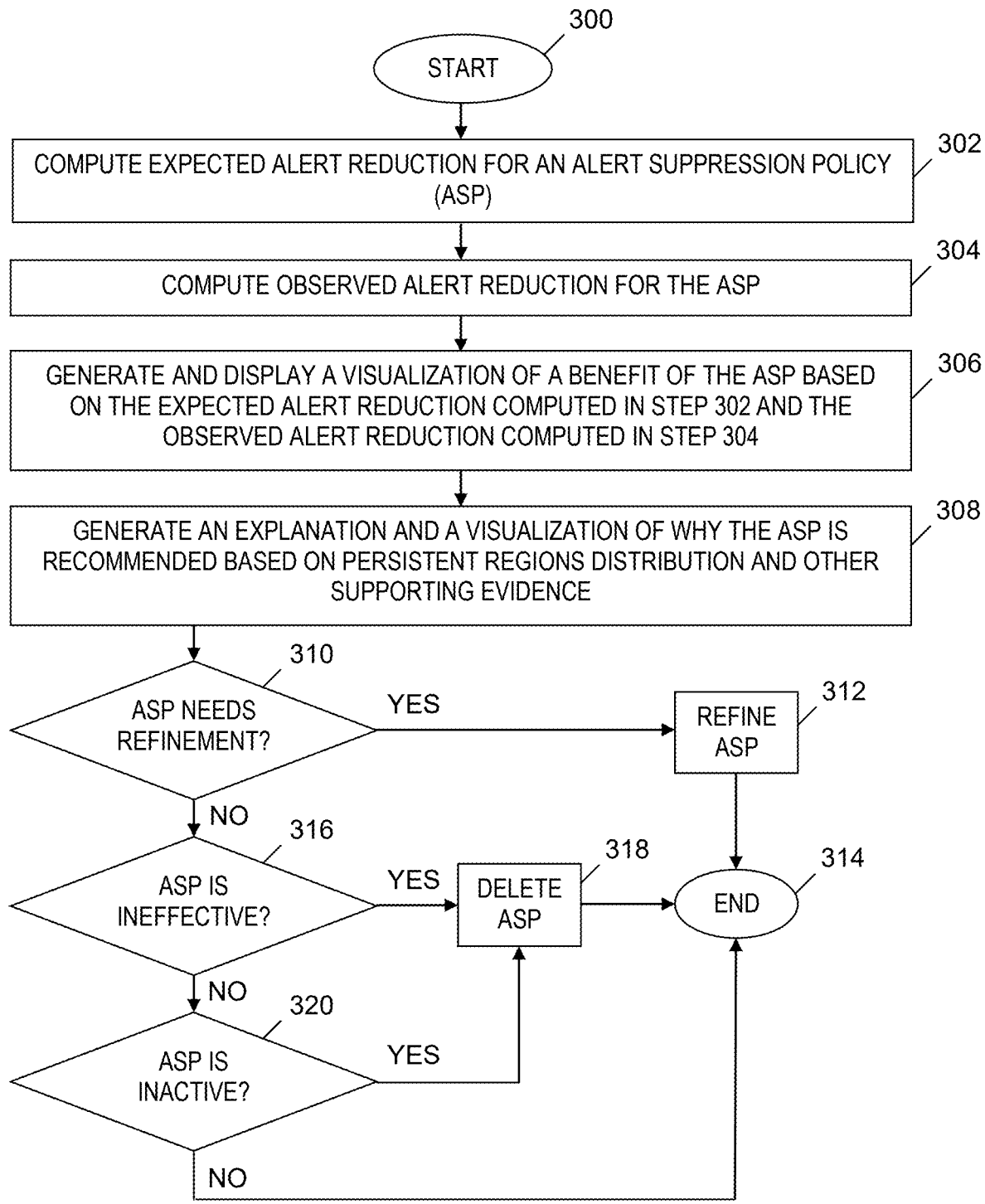
FIG. 3 is a flowchart of a process of providing explainability-driven control of an alert suppression policy, where operations of the flowchart are performed by modules in FIG. 2, in accordance with embodiments of the present invention.

FIG. 3 is a flowchart of a process of providing explainability-driven control of an alert suppression policy, where operations of the flowchart are performed by modules in FIG. 2, in accordance with embodiments of the present invention. The process of FIG. 3 begins at a start node 300. In step 302, expected benefit computation module 202 computes an expected alert reduction for an alert suppression policy (ASP).

In step 304, observed benefit computation module 208 computes an observed alert reduction for the ASP.

In step 306, visualization module 206 generates and displays a visualization of a benefit of the ASP based on the expected alert reduction computed in step 302 and the observed alert reduction computed in step 304.

In step 308, policy learned explanation module 204 generates an explanation of why the ASP is recommended based on persistent region distribution and other supporting evidence, and visualization module 206 generates a visualization of the generated explanation. The visualization of the generated explanation is displayed via an output device.

In step 310, policy refinement module 212 determines whether the ASP needs a refinement. If policy refinement module 212 determines in step 310 that the ASP needs a refinement, then the Yes branch of step 310 is followed, policy refinement module 212 marks the ASP as needing refinement, and step 312 is performed. In step 312, policy refinement module 212 refines and relearn policy module 220 relearns the ASP. Following step 312, the process of FIG. 3 ends at an end node 314.

Returning to step 310, if policy refinement module 212 determines that that the ASP does not need a refinement, then the No branch of step 310 is followed and step 316 is performed.

In step 316, ineffective policy identification module 214 determines whether the ASP is ineffective. If ineffective policy identification module 214 determines in step 316 that the ASP is ineffective, then the Yes branch of step 316 is followed, ineffective policy identification module 214 marks the ASP as being ineffective, and step 318 is performed. In step 318, policy deletion module 218 deletes the ASP. Following step 318, the process of FIG. 3 ends at the end node 314.

Returning to step 316, if ineffective policy identification module 214 determines that the ASP is not ineffective, then the No branch of step 316 is followed and step 320 is performed.

In step 320, inactive policy identification module 216 determines whether the ASP is inactive. If inactive policy identification module 216 determines in step 320 that the ASP is inactive, then the Yes branch of step 320 is followed, inactive policy identification module 216 marks the ASP as being inactive, and step 318 is performed. In step 318, policy deletion module 218 deletes the ASP. Again, following step 318, the process of FIG. 3 ends at the end node 314.

Returning to step 320, if inactive policy identification module 216 determines that the ASP is not inactive, then the No branch of step 320 is followed and the process of FIG. 3 ends at the end node 314.

Figure 4:
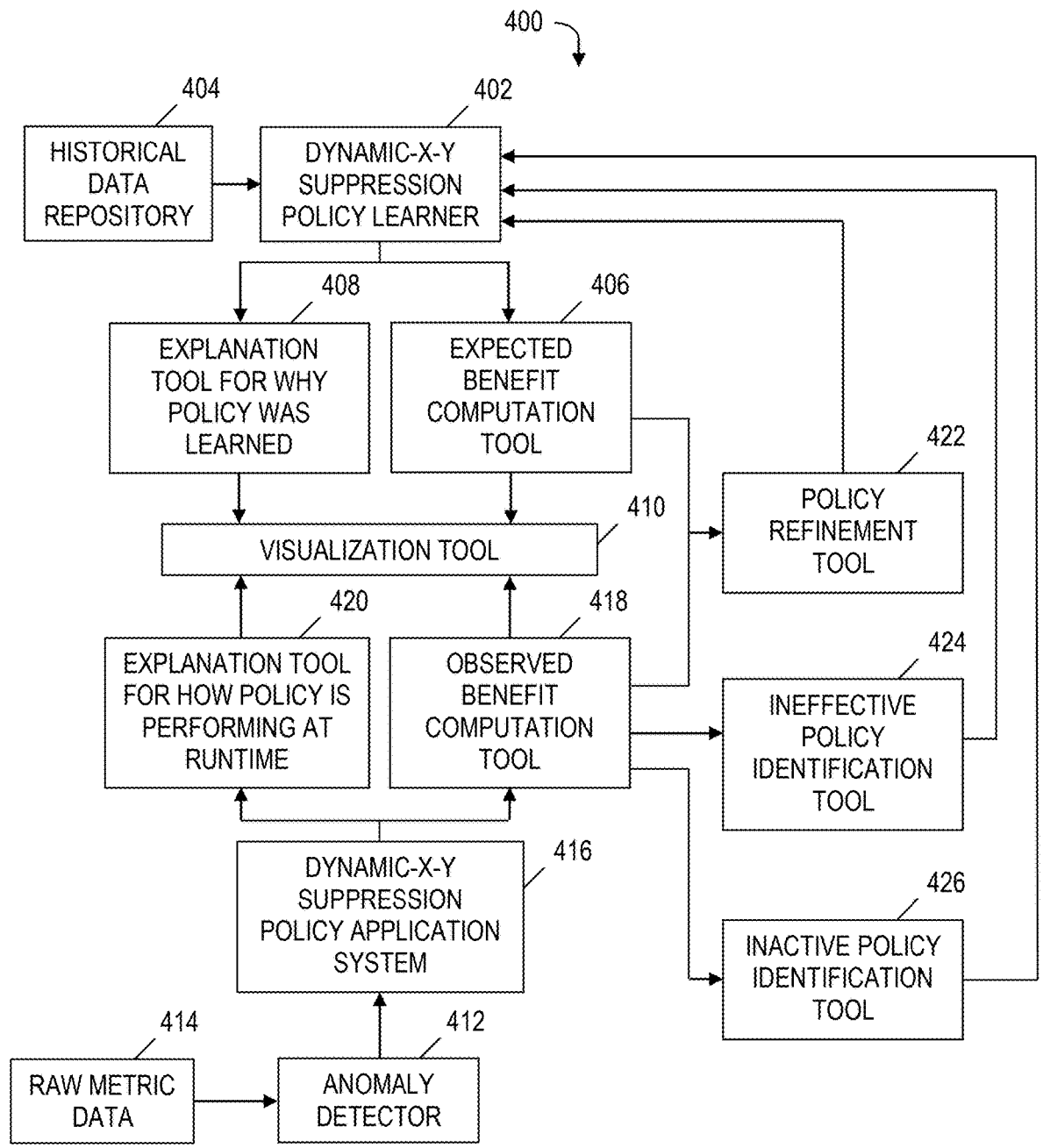
FIG. 4 is a block diagram of components that perform the operations in the flowchart of FIG. 3, in accordance with embodiments of the present invention.

FIG. 4 is a block diagram of components that perform the operations in the flowchart of FIG. 3, in accordance with embodiments of the present invention. System 400 includes a Dynamic-X-Y suppression policy learner 402, a historical data repository 404, an expected benefit computation tool 406, an explanation tool for why policy was learned 408, a visualization tool 410, an anomaly detector 412, raw metric data 414, a Dynamic-X-Y suppression policy application system 416, an observed benefit computation tool 418, an explanation tool for how policy is performing at runtime 420, a policy refinement tool 422, an ineffective policy identification tool 424, and an inactive policy identification tool 426. Hereinafter, for simplicity, the aforementioned explanation tool for why policy was learned 408 is referred to as explanation tool 408 and explanation tool for how policy is performing at runtime 420 is referred to as explanation tool 420.

Execution of expected benefit computation module 202, policy learned explanation module 204, visualization module 206, observed benefit computation module 208, policy runtime performance explanation module 210, policy refinement module 212, ineffective policy identification module 214, inactive policy identification module 216, and relearn policy module 220 provides functionality of expected benefit computation tool 406, explanation tool 408, visualization tool 410, observed benefit computation tool 418, explanation tool 420, policy refinement tool 422, ineffective policy identification tool 424, inactive policy identification tool 426, and Dynamic-X-Y suppression policy learner 402, respectively.

Dynamic Explanation in the Form of Benefit

Dynamic-X-Y suppression policy learner 402 uses the aforementioned Dynamic-X-Y for alert suppression approach (or another known suppression policy recommendation technique) to learn and recommend an ASP based on historical training data that resides in historical data repository 404. The historical training data in historical data repository 404 includes event time series, alerts on the events specified in the time series, and incidents reported on the alerts. In one embodiment, Dynamic-X-Y suppression policy learner learns alert suppression policies at a metric level (e.g., tcp-retrans error, http-error, etc.). For each of the metrics, Dynamic-X-Y suppression policy learner 402 generates an alert suppression policy in the form of X and Y, where X is the number of events within a Y duration. If an alert does not qualify for the aforementioned condition of X number of events within a Y duration, then a system implementing the Dynamic-X-Y for alert suppression approach suppresses the alert.

Figure 5:
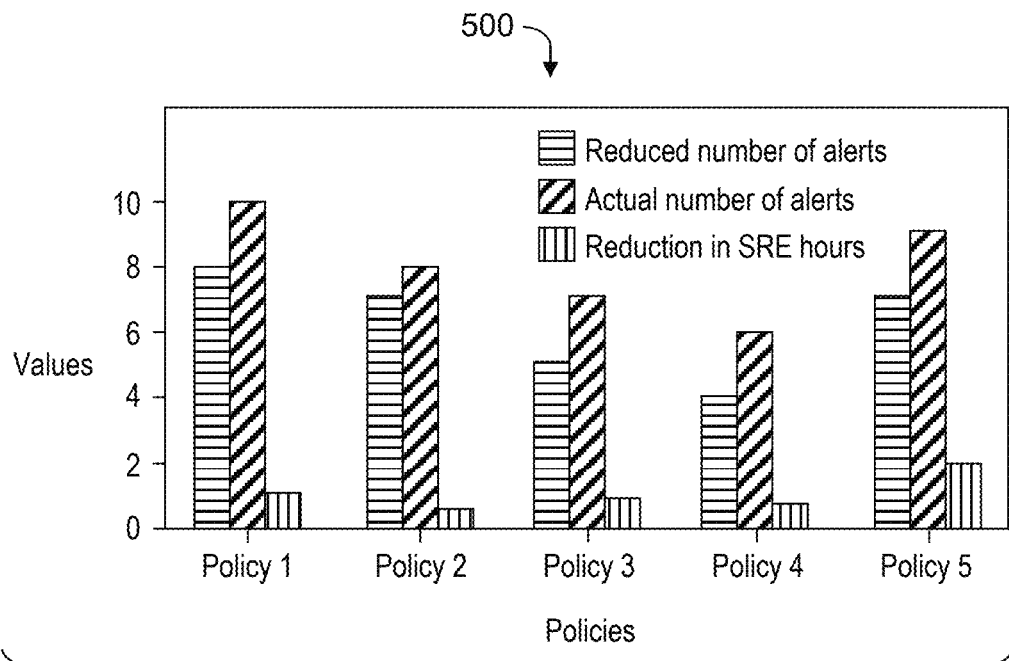
FIG. 5 is a bar chart illustrating an example of an expected reduction in the number of alerts as provided by operations included in the process of FIG. 3, in accordance with embodiments of the present invention.

Expected benefit computation tool 406 computes expected benefits of implementing the recommended ASP. The computed expected benefits include a number of alerts suppressed, a number of incidents suppressed, cost saved, and/or a measurement of resources saved that result from an application of the ASP to the historical training data in historical data repository 404. Expected benefit computation tool 406 applies the ASP to the alerts present in the historical training data for each window of size W with slide H. For each window of size W, expected benefit computation tool 406 measures the reduction in the incidents reported in the historical training data. The reduction is measured based on how many alerts the application of the ASP would suppress, where the alerts resulted in incidents. The reduction is measured for each ASP separately. An incident would not have been reported if the triggering alert had been suppressed by the application of the ASP. The reductions in alerts and incidents during training data are also referred to herein as expected reductions. Expected reductions can also include expected cost savings, expected resource savings, expected reductions in incidents, and/or expected reductions in Site Reliability Engineer (SRE) hours. An example of a bar plot illustrating expected reductions is shown in FIG. 5.

In one embodiment, expected benefit computation tool 406 computes the reduction in alerts and incidents by using the formulas presented below:

Alert reduction=(# of alerts reported−# of alerts suppressed)*100/# of alerts reported ("−" sign indicates "minus", i.e., subtraction)

Figure 6:
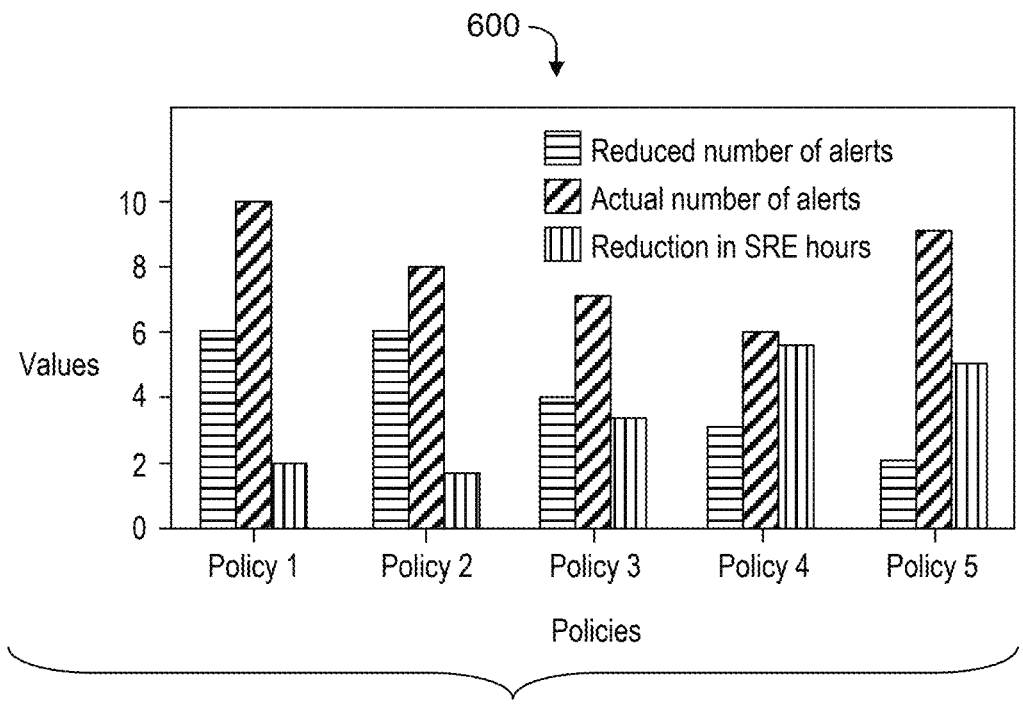
FIG. 6 is a bar chart illustrating an example of an observed reduction in the number of alerts over a selected period of time, as provided by operations included in the process of FIG. 3, in accordance with embodiments of the present invention.

Incident reduction=(# of incidents reported−# of incidents suppressed)*100/# of incidents reported During runtime, anomaly detector 412 receives and uses raw metric data 414 (or log data) to detect anomalous events, which are the bases for the generation of runtime streaming alerts and incidents, and which are received by Dynamic-X-Y suppression policy application system 416. Observed benefit computation tool 418 receives the runtime streaming alerts and incidents from Dynamic-X-Y suppression policy application system 416 and computes the alert reduction for each ASP and the incident reduction, again for each window of size W with slide H. Observed benefit computation tool 418 computes the alert reduction based on the reported alerts compared with suppressed alerts, and furthermore computes the incident reduction based on the reported incidents compared with suppressed incidents. The aforementioned reductions of alerts and incidents during runtime are also referred to herein as observed reductions (also referred to herein as actual reductions). Observed reductions can also include observed cost savings, observed resource savings, observed reductions in incidents, or observed reductions in SRE hours. An example of a bar plot illustrating observed reductions is shown in FIG. 6.

Visualization tool 410 generates a visualization of the actual reduction and the expected reduction as bar plots. In one embodiment, in a given bar plot generated by visualization tool 410, each alert suppression policy is represented with a pair of bars. One bar in the pair of bars indicates a measure of reported alerts (e.g., a number of reported alerts or a percentage of reported alerts) irrespective of an ASP and the other bar in the pair indicates a measure of a reduced number of alerts (or a measure of suppressed alerts) due to an application of the ASP. The difference between the number of reported alerts and the reduced number of alerts is the number of suppressed alerts.

After waiting for H duration and utilizing a user interface provided by visualization tool 410, a user slides a data window of size W and again observed benefit computation tool 418 computes new observed reductions as described above, and visualization tool 410 generates and displays the new observed reductions as bar plots.

Explain why a Policy is Recommended

Figure 7:
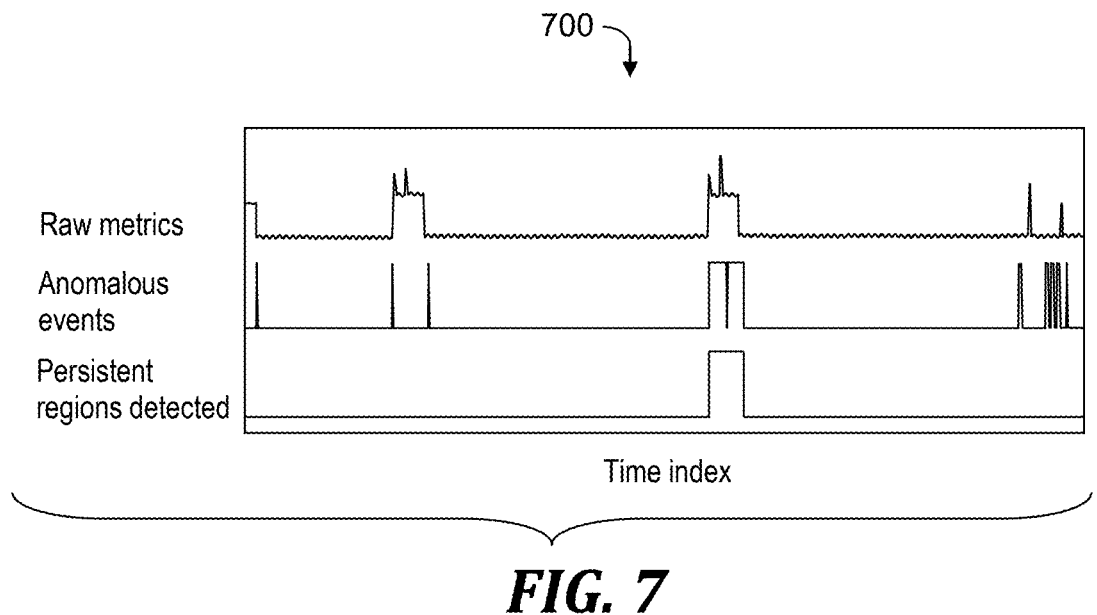
FIG. 7 depicts three time index charts that illustrate an explanation of why an alert suppression policy is recommended, where the explanation is provided by operations included in the process of FIG. 3, in accordance with embodiments of the present invention.

Explanation tool 408 receives the historical training data sent from Dynamic-X-Y suppression policy learner 402 for each ASP. For each ASP and from the historical training data, explanation tool 408 retrieves persistent regions for the various event time series (e.g., how many resources). Explanation tool 408 considers K values (e.g., K resources) for the ASP, which means that there are K event time series. For each event time series, explanation tool 408 determines the persistent regions. Visualization tool 410 generates a visualization of the persistent regions on a time graph and shows the width in terms of duration, Y, and the number of events present (i.e., X number of events). Explanation tool 408 also determines supporting evidence for each persistent region. For example, if there is an issue with the user experience at the time of a persistent region, which includes explanation tool 408 measuring a high latency (i.e., measuring a latency that exceeds a threshold latency amount) or a high error rate (i.e., measuring an error rate that exceeds a threshold error rate), then the measure(s) are included as supporting evidence. In one embodiment, for each (resource, metric) event time series, explanation tool 408 computes the correlation of the persistent region's time series. In response to the computed correlation being high (i.e., exceeding a threshold correlation value), the (resource, metric) pair is included in the supporting evidence. An example of the explanation provided by explanation tool 408 is shown in FIG. 7.

Alert Suppression Policy Refinement

Policy refinement tool 422 receives the alert reductions and the incident reductions for each ASP over a given time period. In one embodiment, the given time period is a configurable parameter (e.g., every month or every two months).

Policy refinement tool 422 considers the expected reduction in alerts to be:

ex_ar=<ex_ar_1, ex_ar_2, ex_ar_3, . . . , ex_ar_n>, where n is an integer greater than or equal to one.

Policy refinement tool 422 considers the expected reduction in incidents to be:

ex_ir=<ex_ir_1, ex_ir 2, ex_ir 3, . . . , ex_ir_n>

For each policy p, policy refinement tool 422 considers n windows: w_1, w_2, w_3, . . . , w_n along with their corresponding observed reductions in alerts and incidents.

Policy refinement tool 422 considers the observed reductions in alerts to be:

ac_ar=<ac_ar_1, ac_ar_2, ac_ar_3, . . . , ac_ar_n> for the n windows.

Policy refinement tool 422 considers the observed reductions in incidents to be:

ac_ir=<ac_ir_1, ac_ir 2, ac_ir_3, ... , ac_ir_n> for the n windows.

In one embodiment, policy refinement tool 422 uses a first approach to detect if the actual reductions in alerts and incidents have deviated significantly from the expected reductions. In the first approach, policy refinement tool 422 treats the reductions in alerts and incidents over time as distributions and if the Kullback-Leibler (KL) divergence is high (i.e., the KL divergence exceeds a threshold amount), then the actual reductions in alerts and incidents have significantly deviated from the expected reductions. In the first approach, policy refinement tool 422 computes KL divergences for the alerts and the incidents by using the following formulas:

$$KL\_alerts = KL\_divergence(ex\_ar, ac\_ar)$$

$$KL\_incidents = KL\_divergence(ex\_ir, ac\_ir)$$

If either KL_alerts or KL_incidents is high (i.e., if KL_alerts exceeds a first threshold amount or KL_incidents exceeds a second threshold amount), then policy refinement tool 422 determines a weighted average of KL_alerts and KL_incidents. If the weighted average is high (i.e., the weighted average exceeds a threshold weighted average amount), then policy refinement tool 422 marks the ASP as needing to be refined and, in response, refines the ASP.

In one embodiment, policy refinement tool 422 uses a second approach to detect if the actual reductions in alerts and incidents have deviated significantly from the expected reductions. In the second approach, policy refinement tool 422 considers the average of the expected reductions to be avg_ex_ar and avg_ex_ir for alerts and incidents, respectively. Policy refinement tool 422 constructs two time series for the difference between the observed reduction and the average of the expected reductions for alerts (i.e., a_diff) and incidents (i.e., i_diff), as shown in the formulas presented below:

$$a\_diff = <(ac\_ar\_1 - avg\_ex\_ar), (ac\_ar\_2 - avg\_ex\_ar), (ac\_ar\_3 - avg\_ex\_ar), \ldots, (ac\_ar\_n - avg\_ex\_ar)>$$

$$i\_diff = <(ac\_ir\_1 - avg\_ex\_ir), (ac\_ir\_2 - avg\_ex\_ir), (ac\_ir\_3 - avg\_ex\_ir), \ldots, (ac\_ir\_n - avg\_ex\_ir)>$$

In the second approach, policy refinement tool 422 analyzes the constructed time series and finds various patterns. If the moving average of a_diff remains close to avg_ex_ar (i.e., within a predefined tolerance), then policy refinement tool 422 determines that there is not a significant deviation between the actual reduction and the expected reduction in alerts. If the moving average of a_diff does not remain close to avg_ex_ar, then policy refinement tool 422 determines that there is a significant deviation between the actual reduction and expected reduction in alerts, marks the ASP as needing refinement, and refines the ASP. Similarly, if the moving average of i_diff remains close to avg_ex_ir (i.e., within a predefined tolerance), then policy refinement tool 422 determines that there is not a significant deviation between the actual reduction and the expected reduction in incidents. If the moving average of i_diff does not remain close to avg_ex_ir, then policy refinement tool 422 determines that there is a significant deviation between the actual reduction and the expected reduction in incidents, marks the ASP as needing refinement, and refines the ASP.

Figure 8:
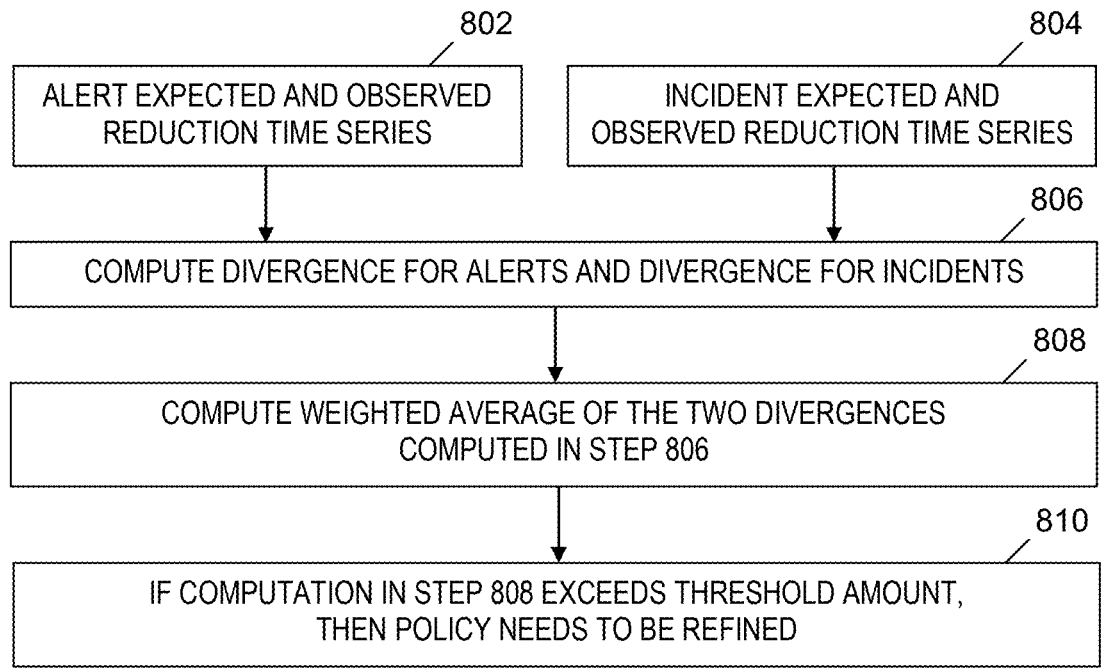
FIG. 8 is an example of a process for automatically determining that an alert suppression policy needs a refinement, in accordance with embodiments of the present invention.

An example that includes operations performed by policy refinement tool 422 is shown in FIG. 8.

Ineffective Alert Suppression Policy Identification

Ineffective policy identification tool 424 receives as input the observed reduction and expected reduction in alerts and explanations for why an ASP is recommended. Ineffective policy identification tool 424 determines that the ASP needs to be deleted or disabled if one or both of the following rules are triggered:

(1) If the behavior of persistent regions in the current events significantly deviates from the explanation determined for why an ASP is recommended (i.e., the behavior of the system has changed significantly), then ineffective policy identification tool 424 identifies the ASP as needing to be deleted or disabled. After an ASP is enabled, explanation tool 420 continually detects persistent regions and computes statistics related to the detected persistent regions. The statistics include the number of persistent regions (averaged out) and the widths of the persistent regions (averaged out). If there is a significant change in the statistics of the detected persistent regions as compared to the persistent regions determined for the training period (i.e., the difference between the statistics exceeds a threshold amount), then ineffective policy identification tool 424 determines that the behavior of the system has changed significantly, identifies the ASP as needing to be deleted or disabled, notifies an end user that the ASP is ineffective, and recommends to the end user that the ASP be deleted or disabled.

(2) If the gain (i.e., reduction in alerts) is not significant over a given time period, using the explanation provided in the form of benefit (i.e., the explanation provided by explanation tool 420), then ineffective policy identification tool 424 identifies the ASP as needing to be deleted or disabled. Ineffective policy identification tool 424 considers the gain as a time series and analyzes the time series to identify patterns. If the time series is constantly decreasing and the gain has plateaued out near zero (i.e., the difference between the gain and zero is less than a predetermined threshold value), the ineffective policy identification tool 424 determines that the gain is not significant over the given time period and identifies the ASP as needing to be deleted or disabled, notifies an end user that the ASP is ineffective, and recommends to the end user that the ASP be deleted or disabled.

Ineffective policy identification tool 424 also receives observed and expected reductions in incidents and performs operations analogous to the operations described above to determine if another gain (i.e., a reduction in incidents) is not significant over the given time period. If the reduction in incidents over the give time period is not significant, ineffective policy identification tool 424 identifies the ASP as needing to be deleted or disabled.

Inactive Alert Suppression Policy Identification

Inactive policy identification tool 426 receives as input the observed reduction and expected reduction in alerts and explanations for why an ASP is recommended. Inactive policy identification tool 426 determines that the ASP is inactive and needs to be deleted or disabled if the ASP is not triggered over a time period that exceeds a threshold period of time. IF the ASP is determined to be inactive, inactive policy identification tool 426 notifies an end user that the ASP is inactive and recommends to the end user that the inactive ASP be deleted or disabled.

The threshold period of time can be supplied, considering the nature of the application; e.g., a banking-related app may have a threshold period of time that is less than three months, while a less frequently used app may have a longer threshold period of time, such as more than six months.

EXAMPLES

FIG. 5 is a bar chart illustrating an example 500 of an expected reduction in the number of alerts and the number of SRE hours as provided by operations included in the process of FIG. 3, in accordance with embodiments of the present invention. Example 500 includes groups of three bars, each group corresponding to a particular ASP, where a first bar in a given group indicates a reduced number of alerts based on the ASP being applied to the historical training data, a second bar in the group indicates an actual number of reported alerts as indicated in the historical training data, and a third bar in the group indicates an expected reduction in SRE hours based on the ASP being applied to the historical training data.

FIG. 6 is a bar chart illustrating an example 600 of an observed reduction in the number of alerts over a selected period of time, as provided by operations included in the process of FIG. 3, in accordance with embodiments of the present invention. Example 600 includes groups of three bars, each group corresponding to a particular ASP, where a first bar in a given group indicates an observed reduced number of alerts based on the ASP being applied during runtime (i.e., the number of alerts observed by an end user, which does not include the number of alerts suppressed by the ASP), a second bar in the group indicates an observed actual number of alerts being reported to the system during runtime (i.e., the number of alerts indicated by the first bar plus the number of suppressed alerts), and a third bar in the group indicates an observed reduction in SRE hours based on the ASP being applied during runtime.

FIG. 7 depicts an example 700 that includes three time index charts that illustrate an explanation of why an alert suppression policy is recommended, where the explanation is provided by operations included in the process of FIG. 3, in accordance with embodiments of the present invention. Example 700 includes a top chart, a middle chart, and a bottom chart. The top chart is based on raw metrics (i.e., raw metric values emitted from a resource). The middle chart indicates anomalous events. For the middle chart, an anomaly detection algorithm employed by explanation tool 408 detects metric events time series for the raw metric values illustrated in the top chart. The detected metric events time series are input to a persistent regions detection module employed by explanation tool 408. The persistent regions detection module outputs a list of persistent regions consisting of one or more metric anomalous events, as shown in the bottom chart. Example 700 illustrates that while multiple anomalous events are identified, only a single persistent region is identified by the persistent regions detection module.

FIG. 8 is an example of a process for automatically determining that an alert suppression policy needs a refinement, in accordance with embodiments of the present invention. Inputs of alert expected and observed reduction time series 802 and incident expected and observed reduction time series 804 for an ASP are received by policy refinement tool 422 prior to step 806.

In step 806, policy refinement tool 422 computes divergence for alerts based on alert expected and observed reduction time series 802 and computes divergence for incidents based on incident expected and observed reduction time series 804.

In step 808, policy refinement tool 422 computes the weighted average of the two divergences computed in step 806.

In step 810, if the weighted average computation in step 808 exceeds a predetermined threshold amount, then policy refinement tool 422 determines that the ASP needs to be refined.

The descriptions of the various embodiments of the present invention have been presented herein for purposes of illustration but are not intended to be exhaustive or limited to the embodiments disclosed. Many modifications and variations will be apparent to those or ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
computing, by a processor set, using historical training data, and for a time period, an expected alert reduction for an alert suppression policy (ASP) recommended for an information technology (IT) environment;
computing, by the processor set, during runtime, and for the time period, an observed alert reduction for the ASP;
generating a visualization of a benefit of the ASP by generating a visualization of a comparison of the observed alert reduction and the expected alert reduction; and
generating an explanation of why the ASP is recommended for the IT environment by determining persistent regions for respective event time series from the historical training data, each event time series corresponding to a given resource for the ASP, and generating a visualization of the persistent regions on a time graph that includes a duration and a number of events for a given persistent region.

2. The method of claim 1, further comprising:
computing, using the historical training data, expected alert reductions and expected incident reductions for the ASP over each of n time periods, n being an integer greater than one;
computing, during runtime, observed alert reductions and observed incident reductions for the ASP over each of the n time periods;
determining a measure of a first deviation between the observed alert reductions and the expected alert reductions and a measure of a second deviation between the observed incident reductions and the expected incident reductions;
determining that the measure of the first deviation or the measure of the second deviation exceeds a threshold amount;
based on the measure of the first or second deviation exceeding the threshold amount, determining that the ASP needs to be refined; and
in response to the determining that the ASP needs to be refined, refining the ASP so that actual alert and incident reductions for the refined ASP do not deviate significantly, based on the threshold amount, from expected alert and incident reductions for the refined ASP.

3. The method of claim 2, wherein the determining the measure of the first deviation includes computing a Kullback-Leibler (KL) divergence for alert reductions by using the expected alert reductions for the ASP and the observed alert reductions for the ASP,
  wherein the determining the measure of the second deviation includes computing a KL divergence for incident reductions by using the expected incident reductions for the ASP and the observed incident reductions for the ASP, and
  wherein the determining that the measure of the first deviation or the measure of the second deviation exceeds the threshold amount includes determining that the KL divergence for the alert reductions exceeds the threshold amount or the KL divergence for the incident reductions exceeds the threshold amount.

4. The method of claim 2, further comprising:
computing a first Kullback-Leibler (KL) divergence for alert reductions by using the expected alert reductions for the ASP and the observed alert reductions for the ASP, wherein the determining the measure of the first deviation includes the computing the KL divergence for the alert reductions;
computing a second KL divergence for incident reductions by using the expected incident reductions for the ASP and the observed incident reductions for the ASP, wherein the determining the measure of the second deviation includes the computing the KL divergence for the incident reductions; and
computing a weighted average of the first and second KL divergences,
  wherein the determining that the measure of the first deviation or the measure of the second deviation exceeds the threshold amount includes determining that the weighted average of the first and second KL divergences exceeds the threshold amount.

5. The method of claim 2, further comprising:
computing an average of the expected alert reductions;
computing an average of the expected incident reductions;
generating a first time series for a difference between the observed alert reductions and the average of the expected alert reductions;
generating a second time series for a difference between the observed incident reductions and the average of the expected incident reductions;
determining a first difference between a moving average for the first time series and the average of the expected alert reductions; and
determining a second difference between a moving average for the second time series and the average of the expected incident reductions,
  wherein the determining that the measure of the first deviation or the measure of the second deviation exceeds the threshold amount includes determining that the first difference exceeds the threshold amount or the second difference exceeds the threshold amount.

6. The method of claim 1, further comprising:
detecting that the ASP is not triggered over a threshold period of time;
in response to the ASP not being triggered over the threshold period of time, marking the ASP as a policy that is inactive; and
in response to the marking the ASP as the policy that is inactive, deleting the ASP.

7. The method of claim 1, further comprising:
during runtime, detecting persistent regions associated with the ASP and computing statistics about the detected persistent regions, the statistics including a number of detected persistent regions and widths of the detected persistent regions;
determining a deviation between the computed statistics about the detected persistent regions and statistics about persistent regions associated with the generated explanation of why the ASP is recommended;
determining that the deviation exceeds a threshold amount;
in response to the determining that the deviation exceeds the threshold amount, marking the ASP as a policy that is ineffective; and
in response to the marking the ASP as the policy that is ineffective, deleting the ASP.

8. The method of claim 1, further comprising:
computing a gain over a period of time, the gain including observed alert reductions for the ASP;
generating a time series for the computed gain;
determining that the computed gain in the time series is constantly decreasing;
determining that the computed gain in the time series plateaus to amounts whose difference from zero is less than a threshold amount;
in response to the determining that the computed gain is constantly decreasing and the determining that the computed gain plateaus to amounts whose difference from zero is less than the threshold amount, marking the ASP as a policy that is ineffective; and
in response to the marking the ASP as the policy that is ineffective, deleting the ASP.

9. A computer system comprising:
a processor set;
one or more computer-readable storage media; and
program instructions stored on the one or more computer-readable storage media to cause the processor set to perform computer operations comprising:
  computing, using historical training data and for a time period, an expected alert reduction for an alert suppression policy (ASP) recommended for an information technology (IT) environment;
  computing, during runtime and for the time period, an observed alert reduction for the ASP;
  generating a visualization of a benefit of the ASP by generating a visualization of a comparison of the observed alert reduction and the expected alert reduction; and
  generating an explanation of why the ASP is recommended for the IT environment by determining persistent regions for respective event time series from the historical training data, each event time series corresponding to a given resource for the ASP, and generating a visualization of the persistent regions on a time graph that includes a duration and a number of events for a given persistent region.

10. The computer system of claim 9, wherein the computer operations further comprise:
computing, using the historical training data, expected alert reductions and expected incident reductions for the ASP over each of n time periods, n being an integer greater than one;
computing, during runtime, observed alert reductions and observed incident reductions for the ASP over each of the n time periods;
determining a measure of a first deviation between the observed alert reductions and the expected alert reductions and a measure of a second deviation between the observed incident reductions and the expected incident reductions;

determining that the measure of the first deviation or the measure of the second deviation exceeds a threshold amount;

based on the measure of the first or second deviation exceeding the threshold amount, determining that the ASP needs to be refined; and in response to the determining that the ASP needs to be refined, refining the ASP so that actual alert and incident reductions for the refined ASP do not deviate significantly, based on the threshold amount, from expected alert and incident reductions for the refined ASP.

11. The computer system of claim 10, wherein the determining the measure of the first deviation includes computing a Kullback-Leibler (KL) divergence for alert reductions by using the expected alert reductions for the ASP and the observed alert reductions for the ASP, wherein the determining the measure of the second deviation includes computing a KL divergence for incident reductions by using the expected incident reductions for the ASP and the observed incident reductions for the ASP, and wherein the determining that the measure of the first deviation or the measure of the second deviation exceeds the threshold amount includes determining that the KL divergence for the alert reductions exceeds the threshold amount or the KL divergence for the incident reductions exceeds the threshold amount.

12. The computer system of claim 10, wherein the computer operations further comprise:

computing a first Kullback-Leibler (KL) divergence for alert reductions by using the expected alert reductions for the ASP and the observed alert reductions for the ASP, wherein the determining the measure of the first deviation includes the computing the KL divergence for the alert reductions;

computing a second KL divergence for incident reductions by using the expected incident reductions for the ASP and the observed incident reductions for the ASP, wherein the determining the measure of the second deviation includes the computing the KL divergence for the incident reductions; and computing a weighted average of the first and second KL divergences, wherein the determining that the measure of the first deviation or the measure of the second deviation exceeds the threshold amount includes determining that the weighted average of the first and second KL divergences exceeds the threshold amount.

13. The computer system of claim 10, wherein the computer operations further comprise:

computing an average of the expected alert reductions;

computing an average of the expected incident reductions;

generating a first time series for a difference between the observed alert reductions and the average of the expected alert reductions;

generating a second time series for a difference between the observed incident reductions and the average of the expected incident reductions;

determining a first difference between a moving average for the first time series and the average of the expected alert reductions; and determining a second difference between a moving average for the second time series and the average of the expected incident reductions, wherein the determining that the measure of the first deviation or the measure of the second deviation exceeds the threshold amount includes determining that the first difference exceeds the threshold amount or the second difference exceeds the threshold amount.

14. The computer system of claim 9, wherein the computer operations further comprise:

detecting that the ASP is not triggered over a threshold period of time;

in response to the ASP not being triggered over the threshold period of time, marking the ASP as a policy that is inactive; and in response to the marking the ASP as the policy that is inactive, deleting the ASP.

15. The computer system of claim 9, wherein the computer operations further comprise:

during runtime, detecting persistent regions associated with the ASP and computing statistics about the detected persistent regions, the statistics including a number of detected persistent regions and widths of the detected persistent regions;

determining a deviation between the computed statistics about the detected persistent regions and statistics about persistent regions associated with the generated explanation of why the ASP is recommended;

determining that the deviation exceeds a threshold amount;

in response to the determining that the deviation exceeds the threshold amount, marking the ASP as a policy that is ineffective; and in response to the marking the ASP as the policy that is ineffective, deleting the ASP.

16. The computer system of claim 9, wherein the computer operations further comprise:

computing a gain over a period of time, the gain including observed alert reductions for the ASP;

generating a time series for the computed gain;

determining that the computed gain in the time series is constantly decreasing;

determining that the computed gain in the time series plateaus to amounts whose difference from zero is less than a threshold amount;

in response to the determining that the computed gain is constantly decreasing and the determining that the computed gain plateaus to amounts whose difference from zero is less than the threshold amount, marking the ASP as a policy that is ineffective; and in response to the marking the ASP as the policy that is ineffective, deleting the ASP.

17. A computer program product comprising:

one or more computer-readable storage media; and program instructions stored on the one or more computer-readable storage media to perform computer operations comprising:

computing, using historical training data and for a time period, an expected alert reduction for an alert suppression policy (ASP) recommended for an information technology (IT) environment;

computing, during runtime and for the time period, an observed alert reduction for the ASP;

generating a visualization of a benefit of the ASP by generating a visualization of a comparison of the observed alert reduction and the expected alert reduction; and generating an explanation of why the ASP is recommended for the IT environment by determining persistent regions for respective event time series from the historical training data, each event time series corresponding to a given resource for the ASP, and generating a visualization of the persistent regions on a time graph that includes a duration and a number of events for a given persistent region.

18. The computer program product of claim 17, wherein the computer operations further comprise:
    computing, using the historical training data, expected alert reductions and expected incident reductions for the ASP over each of n time periods, n being an integer greater than one;
    computing, during runtime, observed alert reductions and observed incident reductions for the ASP over each of the n time periods;
    determining a measure of a first deviation between the observed alert reductions and the expected alert reductions and a measure of a second deviation between the observed incident reductions and the expected incident reductions;
    determining that the measure of the first deviation or the measure of the second deviation exceeds a threshold amount;
    based on the measure of the first or second deviation exceeding the threshold amount, determining that the ASP needs to be refined; and
    in response to the determining that the ASP needs to be refined, refining the ASP so that actual alert and incident reductions for the refined ASP do not deviate significantly, based on the threshold amount, from expected alert and incident reductions for the refined ASP.

19. The computer program product of claim 18, wherein the determining the measure of the first deviation includes computing a Kullback-Leibler (KL) divergence for alert reductions by using the expected alert reductions for the ASP and the observed alert reductions for the ASP, wherein the determining the measure of the second deviation includes computing a KL divergence for incident reductions by using the expected incident reductions for the ASP and the observed incident reductions for the ASP, and
wherein the determining that the measure of the first deviation or the measure of the second deviation exceeds the threshold amount includes determining that the KL divergence for the alert reductions exceeds the threshold amount or the KL divergence for the incident reductions exceeds the threshold amount.

20. The computer program product of claim 18, wherein the computer operations further comprise:
    computing a first Kullback-Leibler (KL) divergence for alert reductions by using the expected alert reductions for the ASP and the observed alert reductions for the ASP, wherein the determining the measure of the first deviation includes the computing the KL divergence for the alert reductions;
    computing a second KL divergence for incident reductions by using the expected incident reductions for the ASP and the observed incident reductions for the ASP, wherein the determining the measure of the second deviation includes the computing the KL divergence for the incident reductions; and
    computing a weighted average of the first and second KL divergences,
    wherein the determining that the measure of the first deviation or the measure of the second deviation exceeds the threshold amount includes determining that the weighted average of the first and second KL divergences exceeds the threshold amount.

* * * * *